(12) United States Patent
Smith et al.

(10) Patent No.: US 6,512,515 B1
(45) Date of Patent: Jan. 28, 2003

(54) DATA COMPRESSION THROUGH MOTION AND GEOMETRIC RELATION ESTIMATION FUNCTIONS

(75) Inventors: Peter D. Smith, Redmond; Jeremy A. Kenyon, Kirkland, both of WA (US)

(73) Assignee: WildTangent, Redmond, WA (US)

( * ) Notice: Subject to any disclaimer, the term of this patent is extended or adjusted under 35 U.S.C. 154(b) by 0 days.

(21) Appl. No.: 09/399,063

(22) Filed: Sep. 18, 1999

(51) Int. Cl.$^7$ ............................................... G06T 15/00
(52) U.S. Cl. ........................................................ 345/419
(58) Field of Search ................................. 345/419, 422, 345/473, 474, 475, 426, 427, 428

(56) References Cited

U.S. PATENT DOCUMENTS

| | | | |
|---|---|---|---|
| 3,656,178 A | 4/1972 | De Maine et al. | 341/87 |
| 5,155,772 A | 10/1992 | Brandman et al. | 704/203 |
| 5,388,209 A | 2/1995 | Akagiri | 704/229 |
| 5,740,409 A | 4/1998 | Deering | 345/409 |
| 5,793,371 A | 8/1998 | Deering | 345/418 |
| 5,867,167 A | 2/1999 | Deering | 345/419 |
| 5,870,094 A | 2/1999 | Deering | 345/419 |

OTHER PUBLICATIONS

Rosenfeld et al. "Digital Picture Processing" Academic Press, 1976, pp. 148–151.*

Huang et al., "Picture Processing and Digital Filtering," Topics in Applied Physics, Apr. 1975, pp. 43–45, vol. 6, Springer-Verlag, Germany.

Naphatali Rishe, "Interval–based aproach to lexicographic representation and compression of numeric data", Data and Knowledge Engineering, 8, 4(1992), pp. 339–351., Copyright 1992.

* cited by examiner

*Primary Examiner*—Phu K. Nguyen
(74) *Attorney, Agent, or Firm*—Columbia IP Law Group, PC

(57) ABSTRACT

A computing-device implemented method for compressing a data model, where such devices include a computer, personal digital assistant (PDA), home appliance, and the like. The data includes bandwidth intensive information such as that used in video conferencing, MPEG and equivalent types of digital video encoding, multi-media data transfers, and interactive gaming. In one implementation, a 3D model has objects defined therein. Each object is defined by plural data points that are transferred from a data provider to a recipient. Typically the provider and recipient are in communication over a network. For a first and a second data point defined in the model, first offsets are determined from the first data point for the second data point. The second data point can then be re-coded in terms of the determined first offsets. The first offsets are coded to require less data storage than required for the first data point, thus allowing them to be transferred more quickly. Second offsets can be cascaded off the first offsets for a third data point defined within the model.

34 Claims, 4 Drawing Sheets

DATA COMPRESSION THROUGH MOTION AND GEOMETRIC RELATION ESTIMATION FUNCTIONS

FIELD OF THE INVENTION

The present invention generally relates to the fields of data compression, and more particularly, to compressing 3D multimedia transfers over a network connection.

BACKGROUND 3D multimedia includes video conferencing, interactive games, web-page content, audio/visual (A/V)recordings, to name but a few (hereafter collectively "A/V data"). A/V data requires significant storage space, as well as substantial bandwidth to transmit the data over a network. Since most data recipients do not have sufficient bandwidth to receive the A/V data in its original form, A/V data has traditionally been retrieved over a local high-speed bus or specialized high-speed data link.

For example, consider computerized games. Games include simple single-user simulators for pinball, cards, gambling, fighting, etc., or more complex multiple-player turn-taking games where each player competed against the game and ultimately compared scores. Well-known high-tech gaming systems include the Nintendo® and Sony PlayStation® gaming systems. These and other games use geometry to describe two and three-dimensional objects within gaming models. In particular, complex object surfaces are usually represented by a combination of one or more basic object shapes, such as splines, non-uniform rational splines (NURBs), texture maps, and (monohedral) triangle tesselation. Typically, an arbitrary object is defined by triangle tesselation, each triangle having associated spatial coordinate tuples X, Y (and perhaps Z), color, normal, and other attributes. This information, when multiplied by hundreds or thousands of polygons in moderately complex objects, amounts data that must be retrieved from dedicated graphics systems and local storage of graphics data. The data transfer requirements prohibit play against remote players. Although some games have been designed to use a modem to directly call a remote player and establish a game, this solution was often clumsy, slow, and inconsistent; rich content transfer was infeasible.

Or, consider video conferencing applications. As with games, these applications concern transferring large volumes of data. However, these applications must transfer the data to remote locations (e.g., conference participants). Therefore, they have required high-speed data links, e.g., at a minimum, a 128K-bit bonded ISDN connection to the remote participant, or more preferably, a T1 or faster frame-relay connection. Unfortunately, these speedy connection backbones are not generally available to users, and require complex technical support to maintain an active link. Conferencing also shares the modem-game limitation of requiring direct user-to-user connections.

With the recent advent of ubiquitous low-cost Internet connections, it has become a relatively straightforward matter to form a network communication link between multiple remote participants. This has spurred interest in using these generally available links to transfer A/V data. Unfortunately, due to the cost and technical complexity of maintaining ISDN, Frame Relay, and other high-speed links, Internet connections are commonly relatively slow modem-based connections. Since modem connections only generally realize an average modem bit rate of 14–40 KBits per second, these connections are not able to transfer, in reasonable time, rich game content, conferencing data, or other A/V data. This problem is exacerbated with each additional remote participant, since A/V data must now be distributed to multiple recipients—further consuming bandwidth resources.

In an effort to reduce bandwidth constraints, and take advantage of the easily-available slow networking connections, there have been efforts to compress A/V data. For example, data and geometry compression has previously been used to reduce information content in 2D and 3D models. Previous compression attempts include image compression (e.g., JPEG), defining objects with shared features (e.g., shared edges), small texture maps for large areas, etc. examples of some of these and other techniques can be found in U.S. Pat. No. 5,740,409 which teaches a 3D graphics accelerator for compressed geometry, and U.S. Pat. Nos. 5,793,371, 5,867,167, and 5,870,094 which teach various methods for more-efficiently encoding 3D models. These compression techniques are readily applicable to A/V game data (which use models), as well as other A/V data representing data in a compatible compressible format, such as Moving Picture Experts Group (MPEG) digital video encoding.

In addition to geometry compression, general purpose data compression procedures has also been applied to A/V data. Such techniques include Huffman encoding (See Huffman, "A Method For Construction Of Minimum Redundancy Codes", Proceedings IRE, 40, 10 pages 1098–1100 (September 1952)), Tunstall encoding (See Tunstall Doctoral thesis, "Synthesis of Noiseless Compression Codes", Georgia Institute of Technology (September 1967)), and Lempel-Ziv encoding (See "A Universal Algorithm For Sequential Data Compression", IEEE Transactions on Information Theory, IT-23, 3, pages 337–343 (May, 1977)), and run-length encoding of model data (see, e.g., U.S. Pat. No. 3,656,178). These general purpose compression techniques are applicable to all data formats.

Unfortunately, even after application of general purpose and geometric compression, there still remains a significant amount of information that needs to be transferred before games, conferencing, viewers of 3D multimedia, interactive 3D chat rooms, and other applications of A/V data appear to operate as if they are retrieving their data from local storage or high-speed links. Thus, some further data reduction is needed.

SUMMARY

A computing-device implemented method for compressing a data model, defined by plural data points, that is transferred from a provider to a recipient. Typically the provider and recipient are in communication over a network. For a first and a second data point defined in the model, first offsets are determined from the first data point for the second data point. The second data point can then be re-coded in terms of the determined first offsets. The first offsets are coded to require less data storage than required for the first data point, thus allowing them to be transferred more quickly. Second offsets can be cascaded off the first offsets for a third data point defined within the model.

Other compression methods and apparatus are disclosed.

DETAILED DESCRIPTION

Although the present invention is applicable to a wide range of application programs, services, and devices which require transmitting rich content (such as A/V data) over a network, the following description focuses on delivering rich multimedia content from a gaming environment to players distributed over the network. The gaming paradigm has been chosen since it teaches delivery of A/V data as required for applications such as video conferencing, while also discussing the logistical complexity inherent in having multiple participants interactively affecting the delivery of A/V data.

Figure 1:
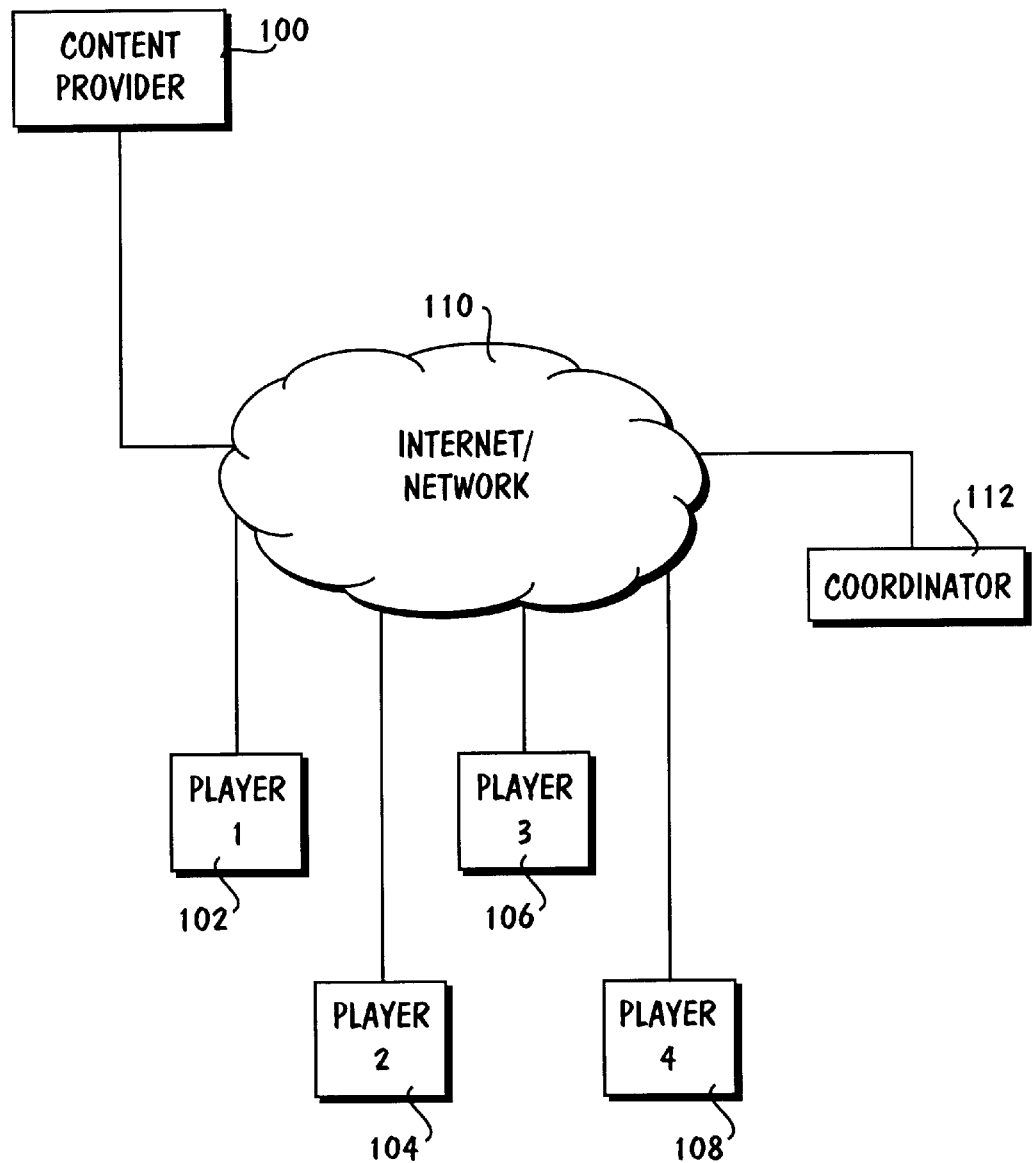
FIG. 1 illustrates a content provider in communication with several content recipients.

FIG. 1 illustrates a game content provider 100 in communication with several users/game players 102–108 over a publicly accessible network 110 such as the Internet. Also shown is a coordinator 112 that, as discussed below, may be coordinating gaming activity. For ease of understanding, it is assumed that the content provided is an interactive three-dimensional game (hence the users are designated as players). The game is assumed to incorporate a 3D model, where objects within the model have attributes such as position, color, texture, lighting, orientation, etc., and where the objects are ultimately defined by one or more triangles. However, as will be readily apparent from the description to follow, the present invention is applicable and may be practiced with all forms of multimedia content delivery.

As shown multiple players 102–108 are in communication with a content provider. In one embodiment, the players utilize an Internet browser as a playing device, where the browser has an installed plug-in (e.g., helper application) to aid in processing content transmitted by the provider. However, instead of a browser, other network application programs, such as dedicated gaming applications, can be used. For simplicity, it is assumed that the provider 100 acts as a central data distribution point for game data, transmitting all required data to each player 102–108. However, it is understood that gaming software can be configured so that players directly send each other information, or that one player or other network location may be used as a distribution point for other players (e.g., to distribute processing load).

Also shown is a game coordinator 112 that can be used as a central point for initiating or joining in to games in progress. Such a coordinator is useful in contexts such as the Internet, since players are routinely assigned random network addresses by their Internet Service Provider. Since a network connection between computers usually requires the computers to know each others' network address, a known coordinator can facilitate such connections by allowing players to contact the coordinator and publish their currently assigned network address. The coordinator can then redirect interested players to one or more content providers (e.g., 100). A coordinator may also be used to hide player identities from content providers, such as through network address hiding, or to coordinate player registration with different providers. Many corporations are now providing centralized "hubs" to facilitate game play; see, e.g., the MSN Gaming Zone (formerly the Internet Gaming zone) by Microsoft Corporation of Redmond Wash. at http://games.msn.com or http://www.microsoft.com/games.

Typically, when a player contacts a provider, the provider attempts to transmit game content to the player. If the player's browser is not yet configured to receive such content, this can trigger an automatic notification to the player to install the requisite plug-in, driver, or other data needed to play the provider's game.

Once a player has come into communication with a content provider, the provider must send game content to the player. As discussed above, various methods have been employed to reduce the amount of data that actually needs to be sent to such players. A significant amount of such data includes transmitting coordinate values for objects within a 3D model. It is advantageous to somehow further reduce the amount of space required for storing such coordinates.

Figure 2:
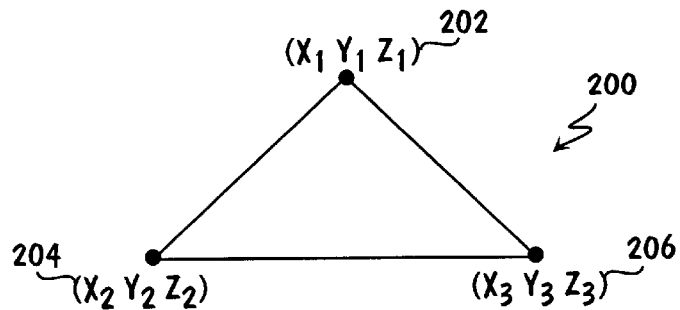
FIG. 2 illustrates a triangle having vertices defined in 3D space.

FIG. 2 illustrates a typical triangle 200 having three vertices 202, 204, 206 defined according to a coordinate system for a particular model. Although the invention is applicable to 2, 3, or n-dimensional coordinates, for simplicity, assume that the each vertex is defined in 3D space with coordinate tuple X, Y, and Z.

Typically, vertex values are encoded using 32-bit ANSI/IEEE-754-1985 floating-point numbers (a standard promulgated by the Institute for Electrical and Electronic Engineers (IEEE) and the American National Standards Institute (ANSI)). Thus each 3D tuples requires 96 bits to encode its coordinates. It is assumed that the vertices are used to define triangles for monohedrally tesellated objects within a 3D model or game. Although other non-triangle shapes can be used to define objects, triangle tesselation is assumed since it is a common requirement of rendering hardware.

To reduce transmission burden between content provider and data recipients, the standard 32-bit IEEE representation is replaced with a special encoding format. Rather than assigning distinct coordinate tuples to all vertices, instead some vertices are encoded using offsets from other vertices. The basis for the offsets can, as described below, be based on a combination of object geometry, predicted movement for the object, and other factors. (Some or all of these bases may be used as desired.)

For example, if a particular region of and object is undergoing a particular type of uniform motion, such as linear or rotational motion, then a key vertex can be defined for an object or region thereof, and the rest of the vertices for the object or region can be functionally assigned values according to the key vertex and analysis of the movement. Note that while discussion focuses on a content provider analyzing model activity and formatting output to a recipient accordingly, it is understood that these same techniques can be applied by a recipient for returning compressed data back to the provider. However, movement is not necessary; these techniques apply to static as well as changing models. Immobile objects are still represented by triangles, and hence triangle positions can be predicted (but with high accuracy due to lack of movement).

Figure 3:
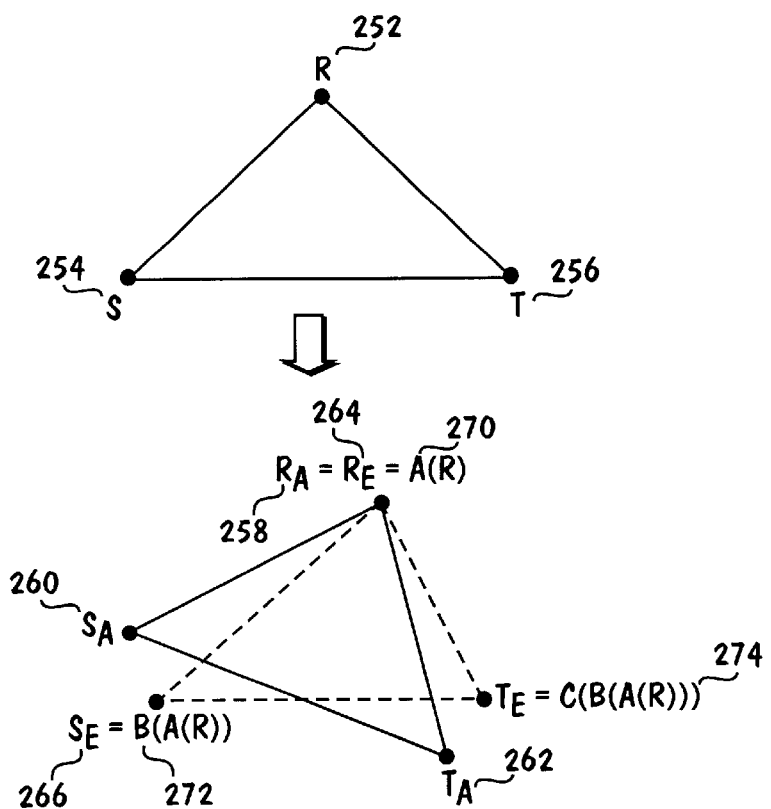
FIG. 3 illustrates using estimation functions to estimate future vertex locations for a clockwise rotation of the FIG. 2 triangle.

FIG. 3, for example, shows an encoding for the FIG. 2 triangle 200 where position values for the second vertex S 254 and third vertex T 256 are computed as a function of a root vertex R 252. (A "root" vertex is a fully-defined (e.g., with typical coordinate values) vertex from which other vertices are defined.) Assume that the triangle is undergoing a slight-clockwise rotation, so that vertices RST rotate into positions $R_A$ 258 ("A" for actual), $S_A$ 260, and $T_A$ 262. Note that this discussion concerns two moments in time, where at time t=0, the triangle is pre-rotation, and has vertices RST, and where at time t=1, the triangle is post-rotation, and has vertices $R_A S_A T_A$.

Note though, that the concept of time is arbitrary for a given model. In particular, estimation functions are described as predicting the position at the next time frame, or moment of time. There may, however, be a number of intervening positional calculations before the "next" moment in time is reached. In particular, the number of intervening steps may vary, or a function may be required to directly jump to a particular time frame. One reason for such variability is to maintain synchronization between recipients using network connections of differing speeds/throughput.

The overall issue here is how to encode the change in vertex values for the triangle. Rather than encoding the triangle $R_A S_A T_A$ with standard IEEE floating point values, requiring 3×32-bits per vertex, or 288 bits, instead each $R_A S_A T_A$ vertex is encoded with a delta value. This value does not refer to recording a change in position for the vertex between two time frames. Instead, in one embodiment, a post-rotation position $R_A$ 258 for vertex R 252 is determined by first applying an estimation function A( ) 270 to vertex R 252. The estimation function takes into account factors such as the triangle's geometry and motion to derive an estimated position for other triangle vertices.

The result of this function 270 is an estimated location $R_E$ 264 ("E" for estimated) for $R_A$ 258. As shown there is a disparity in the estimated 264 and actual 258 vertex positions. Assuming that both a content provider and content recipient share a library of estimation functions, or share state-based analysis routines to adaptively perform estimations, the future $R_A$ position for vertex R can be encoded with an error-correction delta ($\Delta$) value for the disparity, e.g., $\Delta_1 = R_A - R_E$. As illustrated, $R_A = R_E$, so $\Delta_1$ is zero. A receiver/decoder need only know the proper function 270 and corresponding $\Delta$ value to determine that $R_A = A(R) + \Delta_1$.

As with encoding $R_A$, a future position $S_A$ 260 for vertex S 254 can be estimated and encoded as a delta value. However, instead of estimating $S_A$ based on S, $S_A$ can be estimated by applying an estimation function B( ) 272 to $R_A$, giving $S_E = B(A(R) + \Delta_1)$. As illustrated, this computation yields an estimated location $S_E$ 266 near to $S_A$ 260. As with $R_A$, a delta value $\Delta_2$ can be defined to correct the estimated value $S_E$, and stored as the value for $S_A$. When a receiver/decoder attempts to reconstruct vertex $S_A$, it can do so based on information already received for reconstructing vertex $R_A$. That is, knowing the value of R 252, $S_A = B(A(R) + \Delta_1) + \Delta_2$.

A similar procedure can be applied to determine a future position $T_A$ 262 for vertex T 256, where an estimate function C( ) 274 is applied to $S_A$ 260 to cascade determining $T_A$ 262 off of $S_A$ 260. Thus, $T_A = C(B(A(R) + \Delta_1) + \Delta_2) + \Delta_3$. Thus, all that is needed to decode the time t=1 triangle is the original value of a "root" node R 252 from the time t=0 triangle, the delta values, and which function to apply. For complex objects having multiple triangles, a chain of such estimation corrections can be tracked.

An assumption so far, however, is that the delta values contain sufficient precision to allow storing a value to exactly reconstruct vertex locations $R_A$, $S_A$, and $T_A$. However, since one goal is to reduce transmission requirements, delta values are encoded with a bit size smaller than the 32-bit standard numbers (if not, then there is no need for $\Delta$-estimating positions). With each chained estimation, error can increase, ultimately exceeding $\Delta$ precision. When this occurs, a new "root" node is used to base subsequent vertex estimations.

By encoding vertex positions as delta values within a certain $\Delta$ precision, positions can be encoded with arbitrarily fewer bits than required under the ANSI/IEEE-754-1985 32-bit format. The effect, then is to provide a trade off between $\Delta$ bit-size requirements, and the frequency of needing a new root node (e.g., potentially a full 96-bit vertex encoding). The smaller the $\Delta$ precision, the more frequent the root nodes. (Note an assumption that the selection of a proper estimation function 270, 272, 274 will ultimately produce a value exceeding available $\Delta$ precision—this is not necessarily true, depending on the precision of the estimation functions.) Further, delta values can be encoded as integer offsets (allowing for some rounding errors), thus reducing the number of bits required for encoding the values.

Note that exact reconstruction of vertex values is not always desirable. For example, it should also be appreciated that for certain objects, such as distant background scenery, accurate vertex construction is not as important as it is for closer foreground objects. Consequently, a $\Delta$ values may be limited to a precision of only a few (e.g., 4–8) bits, and rounding errors used to provide reconstructed values approximating actual vertex positions. As with previous error accumulation, rounding errors may be tracked to identify when a new root node needs to be transferred for background scenery. Alternatively, a stepping factor can be incorporated into the $\Delta$ values used for distant scenery. Such a value effectively increases the bit size of the delta values by decreasing precision. For example, the Z (depth) coordinate can be used as a multiplier of the $\Delta$ value, so the further the object's distance from a current viewing perspective, the larger the multiplier. Thus, the effective range of the $\Delta$ values can be arbitrarily large, with a corresponding precision decrease.

Not discussed so far are particular estimation functions. This is partly due to such functions having to vary widely according to application context. Essentially, such functions will take into account an object's (or sub-region thereof) geometry, and a type of motion occurring to the object, and use this data to predict future positions for object vertices. As discussed above, these predictions can be chained. The following figures illustrate typical object movement that can base prediction functions. It is understood that these simple examples are for exemplary purposes only and that more complex functions can and will be applied to particular model circumstances.

Figure 4:
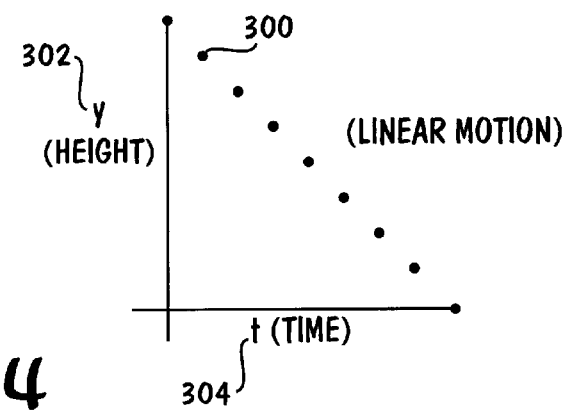
FIG. 4 graphs linear motion as a basis for an estimation function.

FIG. 4 is a graph illustrating linear motion. As shown, movement of an object 300 is tracked with respect to its change in height 302 over time 304. Object 300 is smoothly changing height with respect to time. Consequently, when a content provider 100 (FIG. 1) seeks to encode the object 300, a determination can be made that the object (or sub-region thereof) is undergoing linear motion. The provider can then apply a function, e.g., A( ) 256, that takes advantage of the object's linear motion to predict future spatial positions for the object's vertices as the object moves over time. Thus, instead of having to encode all vertices with 32-bit IEEE-754 floating-point values, instead delta values can be used. As discussed above, the delta values may be encoded with arbitrarily few bits.

Further, rather than having a single function for linear motion estimation, instead a table of estimation formulas can be stored on both the content provider and the data recipient. These formulas can be indexed according to typical model properties and different types of movement, thus allowing them to be applied to diverse data transfers, such as multimedia content, game content, etc. Assuming there are multiple formulas related to linear motion, a content provider can compute an estimation using plural functions (in parallel, for example) to identify which function yields a "best" estimate (e.g., a result having minimum error over actual coordinates $S_A$ 264, $T_A$ 268). An index entry into the table of formulas can be embedded in a data stream sent to a recipient.

Figure 5:
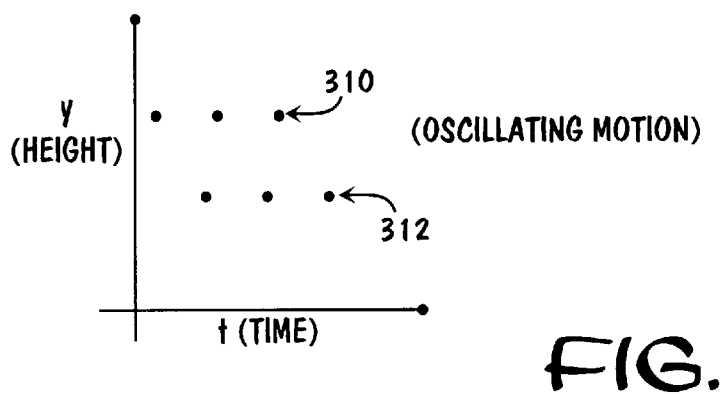
FIG. 5 graphs oscillating motion as a basis for an estimation function.

FIG. 5 graphs simple oscillating motion as a basis for an estimation function. Shown is a graph of an object having height values which oscillate between a higher 310 and lower 312 height position.

As with linear motion, a content provider can determine that an object (or sub-region thereof) is undergoing oscillating motion. The provider can then apply a function, e.g., A( ) 256, that takes advantage of the oscillation to predict future spatial positions for the object's vertices as the object moves over time. Thus, instead of having to encode all vertices with 32-bit IEEE-754 floating-point values, instead delta values can be used. As discussed above, the delta values may be encoded with arbitrarily few bits.

Further, since for oscillating motion is one form of cyclical motion, the provider need only transmit compressed data corresponding to one cycle, along with an embedded message to the data recipient that such data corresponds to a cycle. The recipient may then be responsible for rendering the cycle without further input from the provider, until the recipient or some other agent interferes/interacts with the object.

As with linear motion, entries may be entered into a table of estimation formulas for various different cyclical motions, and a best estimator chosen from those available.

Figure 6:
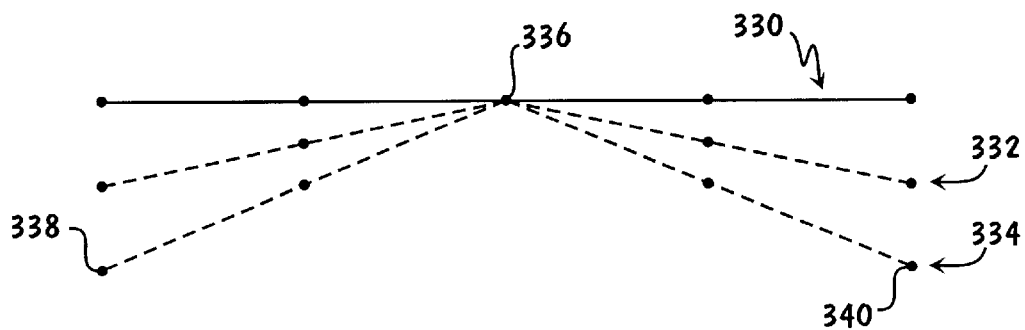
FIG. 6 illustrates physical distortion as a basis for an estimation function.

FIG. 6 illustrates physical distortion as a basis for an estimation function. Shown is a rod 330 that is being bent and then snapping back to original position 330. Shown with dashed lines are two intermediary bent positions 332, 334.

As with the other motion exemplars, a content provider can determine that an object (or sub-region thereof) is being distorted. However, object distortion, such as bending, squeezing, twisting, can generate non-uniform motion of key positions within the object. For example, as shown, the rod's middle-point 336 undergoes little to no movement as the rod is distorted, while the illustrated end-points 338, 340 move more significantly.

Rather than encoding each vertex of the bar 330 with traditional IEEE-754 values, instead a provider recognizes that object's vertices are undergoing different levels of displacement, and uses this information to encode the movement with different sized delta values. That is, the middle-vertex requires a very small delta value, say just a few bits, while the end vertices require a higher precision (more bits) to properly encode their movement.

Thus, a provider can embed flags within a data stream to indicate the size of the delta values for different regions of the object 330. In particular, object vertices can be grouped and transmitted together for a particular delta size, thus reducing on the number of flags needing to be transmitted. As a further optimization, delta values can also (as discussed above) be encoded as integer values, thus significantly reducing transfer requirements. A further optimization is to recognize that for motion such as bending of an object, not all vertices need to be transmitted to a recipient. For example, here, one need only send position and delta values for the end-points 338, 340, since the original and delta positions for intermediary points can be interpolated along the length of the object.

Figure 7:
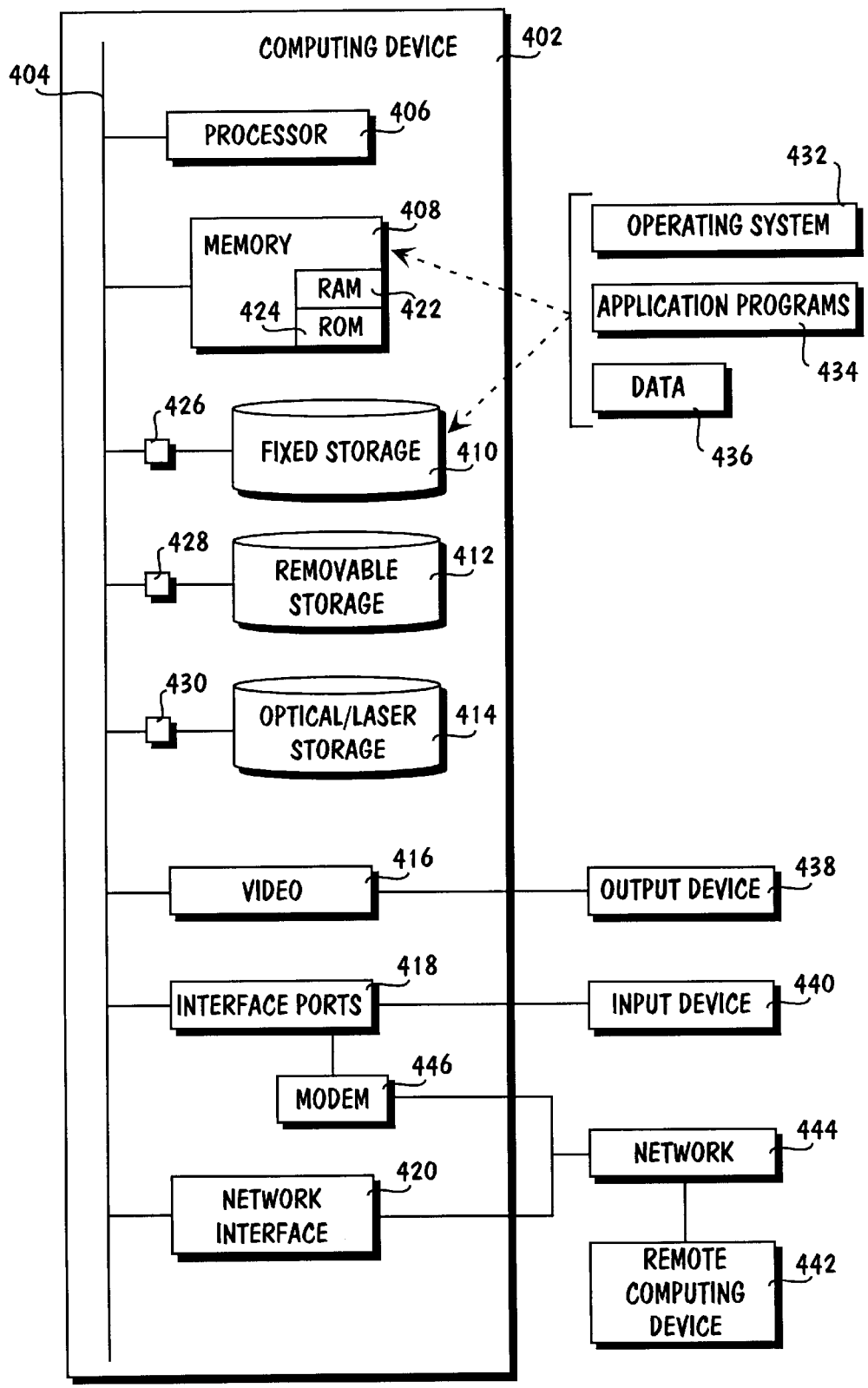
FIG. 7 illustrates a general environment in which the invention or parts thereof may be practiced.

FIG. 7 and the following discussion are intended to provide a brief, general description of a suitable computing environment in which the invention may be implemented. The invention may be described by reference to different high-level program modules and/or low-level hardware contexts. Those skilled in the art will realize that program module references can be interchanged with low-level instructions.

Program modules include procedures, functions, programs, components, data structures, and the like, that perform particular tasks or implement particular abstract data types. The modules may be incorporated into single and multi-processor computing systems, as well as hand-held devices and controllable consumer devices. It is understood that modules may be implemented on a single computing device, or processed over a distributed network environment, where modules can be located in both local and remote memory storage devices.

An exemplary system for implementing the invention includes a computing device 402 having system bus 404 for coupling together various components within the computing device. The system 404 bus may be any of several types of bus structure including a memory bus or memory controller, a peripheral bus, and a local bus using any of a variety of conventional bus architectures such as PCI, AGP, VESA, Microchannel, ISA and EISA, to name a few. Note that only a single bus is illustrated, although plural buses typically achieve performance benefits. Typically, attached to the bus 402 are a processor 406, a memory 408, storage devices (e.g., fixed 410, removable 412, optical/laser 414), a video interface 416, input/output interface ports 418, and a network interface 420.

The processor 406 may be any of various commercially available processors, including Intel processors, or the DEC Alpha, PowerPC, programmable gate arrays, signal processors, or the like. Dual, quad processors, and other multi-processor architectures also can be used. The system memory includes random access memory (RAM) 422, and static or re-programmable read only memory (ROM) 424. A basic input/output system (BIOS), stored in ROM, contains routines for information transfer between device 402 components or device initialization.

The fixed storage 410 generally refers to hard drive and other semi-permanently attached media, whereas removable storage 412 generally refers to a device-bay into which removable media such as a floppy diskette is removably inserted. The optical/laser storage 414 include devices based on CD-ROM, DVD, or CD-RW technology, and are usually coupled to the system bus 404 through a device interface 426, 428, 430. The storage systems and associated computer-readable media provide storage of data and executable instructions for the computing device 402. Note that other storage options include magnetic cassettes, tapes, flash memory cards, memory sticks, digital video disks, and the like.

The exemplary computing device 402 can store and execute a number of program modules within the RAM 422, ROM 424, and storage devices 410, 412, 414. Typical program modules include an operating system 432, application programs 434 (e.g., a web browser or network application program), etc., and application data 436. Program module or other system output can be processed by the video system 416 (e.g., a 2D and/or 3D graphics rendering device), which is coupled to the system bus 404 and an output device 438. Typical output devices include monitors, flat-panels displays, liquid-crystal displays, and recording devices such as video-cassette recorders.

A user of the computing device 402 is typically a person interacting with the computing device through manipulation of an input device 440. Common input devices include a keyboard, mouse, tablet, touch-sensitive surface, digital pen, joystick, microphone, game pad, satellite dish, etc. One can also provide input through manipulation of a virtual reality environment, or through processing the output from a data file or another computing device.

The computing device 402 is expected to operate in a networked environment using logical connections to one or more remote computing devices. One such remote computing device 442 may be a web server or other program module utilizing a network application protocol (e.g., HTTP, File Transfer Protocol (FTP), Gopher, Wide Area Information Server (WAIS)), a router, a peer device or other common network node, and typically includes many or all of the elements discussed for the computing device 402. The computing device 402 has a network interface 420 (e.g., an Ethernet card) coupled to the system bus 404, to allow communication with the remote device 442. Both the local computing device 402 and the remote computing device 442 can be communicatively coupled to a network 444 such as a WAN, LAN, Gateway, Internet, or other public or private data-pathway. It will be appreciated that other communication links between the computing devices, such as through a modem 446 coupled to an interface port 418, may also be used.

In accordance with the practices of persons skilled in the art of computer hardware and software programming, the present invention is described with reference to acts and symbolic representations of operations that are sometimes referred to as being computer-executed. It will be appreciated that the acts and symbolically represented operations include the manipulation by the processor 406 of electrical signals representing data bits which causes a resulting transformation or reduction of the electrical signal representation, and the maintenance of data bits at memory locations in the memory 408 and storage systems 410, 412, 414, so as to reconfigure or otherwise alter the computer system's operation and/or processing of signals. The memory locations where data bits are maintained are physical locations having particular electrical, magnetic, or optical properties corresponding to the data bits.

Having described and illustrated the principles of the invention with reference to illustrated embodiments, it will be recognized that the illustrated embodiments can be modified in arrangement and detail without departing from such principles.

For example, while the foregoing description focused—for expository convenience—on compressing floating point values for vertices, it will be recognized that the same techniques and analyses can be applied to different numeric values needing transport between a content provider and a player (e.g., for compressing sound effects). Consequently, in view of the wide variety of alternate applications for the invention, the detailed embodiments are intended to be illustrative only, and should not be taken as limiting the scope of the invention. Rather, what is claimed as the invention, is all such modifications as may come within the scope and spirit of the following claims and equivalents thereto.

What is claimed is:

1. An apparatus comprising:

storage medium having stored therein a plurality of programming instructions designed to enable the apparatus to provide to a first remote client, a first data value for a first position of a first point of an object at a first point in time, provide to the first remote client, first information identifying a first estimation function for the first remote client to use to compute a second data value that proximately depicts a second position of the first point of the object at a second point in time based on the first data value, to resultantly reflect a motion undergoing by the object, the first estimation function being reflective of the motion, and provide to the first remote client, second information identifying a second estimation function for the first remote client to use to compute a third data value that proximately depicts a third position of a second point of the object at the second point in time based on the computed second data value, to resultantly reflect the motion undergoing by the object, the second estimation function being reflective of a first geometric relationship of the second point to the first point of the object; and at least one processor coupled to the storage medium to execute the programming instructions.

2. The apparatus of claim 1, wherein the programming instructions further enable the apparatus to provide to the first remote client, third information identifying a third estimation function for the first remote client to use to compute a fourth data value that proximately depicts a fourth position of a third point of the object at the second point in time based on the computed third data value, to resultantly reflect the motion undergoing by the object, the third estimation function being reflective of a second geometric relationship of the third point to the second point of the object.

3. The apparatus of claim 2, wherein the programming instructions further enable the apparatus to provide to the first remote client, a first estimation correction delta value for use in conjunction with one of the first, the second and the third estimation function to compute the corresponding one of the first, the second and the third data value to improve its proximate depicting of the corresponding one of the first, the second and the third position of the corresponding one of the first, the second and the third point of the object at the second point in time.

4. The apparatus of claim 2, wherein the programming instructions further enable the apparatus to provide to the first remote client, a first estimation correction delta value for use in conjunction with the first estimation function to compute the second data value to improve its proximate depicting of the second position of the first point of the object at the second point in time, provide to the first remote client, a second estimation correction delta value for use in conjunction with the second estimation function to compute the third data value to improve its proximate depicting of the third position of the second point of the object at the second point in time, and provide to the first remote client, a third estimation correction delta value for use in conjunction with the third estimation function to compute the fourth data value to improve its proximate depicting of the fourth position of the third point of the object at the second point in time.

5. The apparatus of claim 1, wherein the programming instructions further enable the apparatus to
provide to the first remote client, a first estimation correction delta value for use in conjunction with the first estimation function to compute the second data value to improve its proximate depicting of the second position of the first point of the object at the second point in time; and
provide to the first remote client, a second estimation correction delta value for use in conjunction with the second estimation function to compute the third data value to improve its proximate depicting of the third position of the second point of the object at the second point in time.

6. The apparatus of claim 1, wherein the first and second information comprise a first and a second index correspondingly indexing the first and the second estimation function.

7. The apparatus of claim 1, wherein the motion comprises a selected one of a linear motion, an oscillating motion and a snap back motion.

8. The method of claim 1, wherein the programming instructions further enable the apparatus to
provide to the first remote client, a fourth data value for a fourth position of a third point of an object at the first point in time; and
provide to the first remote client, a third information identifying a third estimation function for the first remote client to use to compute a fourth data value that proximately depicts a fifth position of a fourth point of the object at the second point in time based on a fifth data value computed using the first estimation function that proximately depicts a sixth position of the third point at the second point in time, to resultantly reflect the motion undergoing by the object, the third estimation function being reflective of a second geometric relationship of the fourth point to the third point of the object.

9. The apparatus of claim 1, wherein the programming instructions further enable the apparatus to:
provide to a second remote client, the same first data value for the first position of the first point of the object at the first point in time,
provide to the second remote client, the same first information identifying the same first estimation function for the second remote client to use to compute a fourth data value that proximately depicts the second position of the first point of the object at the second point in time based on the same first data value, to likewise resultantly reflect the motion undergoing by the object, and
provide to the second remote client, the same second information identifying the same second estimation function for the second remote client to use to compute a fifth data value that proximately depicts the third position of the second point of the object at the second point in time based on the computed fourth data value, to likewise resultantly reflect the motion undergoing by the object.

10. An apparatus comprising:
storage medium having stored therein a plurality of programming instructions designed to enable the apparatus to
receive from a remote server, a first data value for a first position of a first point of an object at a first point in time,
receive from the remote server, first and second information identifying a first and a second estimation function, the first estimation function being reflective of a motion undergoing by the object, and the second estimation function being reflective of a first geometric relationship of a second point of the point to the first point of the object,
compute a second data value that proximately depicts a second position of the first point of the object at a second point in time based on the first data value, using the first estimation function, to resultantly reflect the motion undergoing by the object, and
compute a third data value that proximately depicts a third position of the second point of the object at the second point in time based on the computed second data value, using the second estimation function, to resultantly reflect the motion undergoing by the object; and
at least one processor coupled to the storage medium to execute the programming instructions.

11. The apparatus of claim 10, wherein the programming instructions further enable the apparatus to
receive from the remote server, third information identifying a third estimation function, the third estimation function being reflective of a second geometric relationship of the third point to the second point of the object, and
compute a fourth data value that proximately depicts a fourth position of a third point of the object at the second point in time based on the computed third data value, using the third estimation function, to resultantly reflect the motion undergoing by the object.

12. The apparatus of claim 11, wherein the programming instructions further enable the apparatus to
receive from the remote server, a first estimation correction delta value; and
perform one of the computations using the corresponding one of the first, the second and the third estimation function and the first estimation correction delta value to improve its proximate depicting of the corresponding one of the first, the second and the third position of the corresponding one of the first, the second and the third point of the object at the second point in time.

13. The apparatus of claim 11, wherein the programming instructions further enable the apparatus to
receive from the remote server, a first, a second and a third estimation correction delta value, and
perform the computations correspondingly using the first, the second and the third estimation function and the first, the second, and the third estimation correction delta value to improve their corresponding proximate depicting of the first, the second and the third position of the first, the second and the third point of the object at the second point in time.

14. The apparatus of claim 10, wherein the programming instructions further enable the apparatus to
receive from the remote server, a first and a second estimation correction delta value, and
perform the computations correspondingly using the first and the second estimation function, and the first and the second estimation correction delta value to improve their corresponding proximate depicting of the first and the second position of the first and the second point of the object at the second point in time.

15. The apparatus of claim 10, wherein the first and second information comprise a first and a second index correspondingly indexing the first and the second estimation function.

16. The apparatus of claim 10, wherein the motion comprises a selected one of a linear motion, an oscillating motion and a snap back motion.

17. The apparatus of claim 10, wherein the programming instructions further enable the apparatus to receive from the remote server, a fourth data value for a fourth position of a third point of an object at the first point in time, receive from the remote server a third information identifying a third estimation function, the third estimation function being reflective of a second geometric relationship of a fourth point to the third point of the object, and compute a fourth data value that proximately depicts a fifth position of the fourth point of the object at the second point in time based on a fifth data value, using the third estimation function, to resultantly reflect the motion undergoing by the object, the fifth data value being computed using the first estimation function and proximately depicting a sixth position of the third point at the second point in time.

18. In a computing server, a method of operation, comprising:

providing to a first remote client, a first data value for a first position of a first point of an object at a first point in time;

providing to the first remote client, first information identifying a first estimation function for the first remote client to use to compute a second data value that proximately depicts a second position of the first point of the object at a second point in time based on the first data value, to resultantly reflect a motion undergoing by the object, the first estimation function being reflective of the motion; and providing to the first remote client, second information identifying a second estimation function for the first remote client to use to compute a third data value that proximately depicts a third position of a second point of the object at the second point in time based on the computed second data value, to resultantly reflect the motion undergoing by the object, the second estimation function being reflective of a first geometric relationship of the second point to the first point of the object.

19. The method of claim 18, wherein the method further comprises providing to the first remote client, third information identifying a third estimation function for the first remote client to use to compute a fourth data value that proximately depicts a fourth position of a third point of the object at the second point in time based on the computed third data value, to resultantly reflect the motion undergoing by the object, the third estimation function being reflective of a second geometric relationship of the third point to the second point of the object.

20. The method of claim 19, wherein the method further comprises providing to the first remote client, a first estimation correction delta value for use in conjunction with one of the first, the second and the third estimation function to compute the corresponding one of the first, the second and the third data value to improve its proximate depicting of the corresponding one of the first, the second and the third position of the corresponding one of the first, the second and the third point of the object at the second point in time.

21. The method of claim 19, wherein the method further comprises providing to the first remote client, a first estimation correction delta value for use in conjunction with the first estimation function to compute the second data value to improve its proximate depicting of the second position of the first point of the object at the second point in time;

providing to the first remote client, a second estimation correction delta value for use in conjunction with the second estimation function to compute the third data value to improve its proximate depicting of the third position of the second point of the object at the second point in time; and providing to the first remote client, a third estimation correction delta value for use in conjunction with the third estimation function to compute the fourth data value to improve its proximate depicting of the fourth position of the third point of the object at the second point in time.

22. The method of claim 18, wherein the method further comprises providing to the first remote client, a first estimation correction delta value for use in conjunction with the first estimation function to compute the second data value to improve its proximate depicting of the second position of the first point of the object at the second point in time; and providing to the first remote client, a second estimation correction delta value for use in conjunction with the second estimation function to compute the third data value to improve its proximate depicting of the third position of the second point of the object at the second point in time.

23. The method of claim 18, wherein the first and second information comprise a first and a second index correspondingly indexing the first and the second estimation function.

24. The method of claim 18, wherein the motion comprises a selected one of a linear motion, an oscillating motion and a snap back motion.

25. The method of claim 18, wherein the method further comprises providing to the first remote client, a fourth data value for a fourth position of a third point of an object at the first point in time; and providing to the first remote client, a third information identifying a third estimation function for the first remote client to use to compute a fourth data value that proximately depicts a fifth position of a fourth point of the object at the second point in time based on a fifth data value computed using the first estimation function that proximately depicts a sixth position of the third point at the second point in time, to resultantly reflect the motion undergoing by the object, the third estimation function being reflective of a second geometric relationship of the fourth point to the third point of the object.

26. The method of claim 18, wherein the method further comprises:

providing to a second remote client, the same first data value for the first position of the first point of the object at the first point in time;

providing to the second remote client, the same first information identifying the same first estimation function for the second remote client to use to compute a fourth data value that proximately depicts the second position of the first point of the object at the second point in time based on the same first data value, to likewise resultantly reflect the motion undergoing by the object; and providing to the second remote client, the same second information identifying the same second estimation function for the second remote client to use to compute a fifth data value that proximately depicts the third position of the second point of the object at the second point in time based on the computed fourth data value, to likewise resultantly reflect the motion undergoing by the object.

27. In a client device, a method of operation, comprising:

receiving from a remote server, a first data value for a first position of a first point of an object at a first point in time;

receiving from the remote server, first and second information identifying a first and a second estimation function, the first estimation function being reflective of a motion undergoing by the object, and the second estimation function being reflective of a first geometric relationship of a second point of the point to the first point of the object;

computing a second data value that proximately depicts a second position of the first point of the object at a second point in time based on the first data value, using the first estimation function, to resultantly reflect the motion undergoing by the object; and computing a third data value that proximately depicts a third position of the second point of the object at the second point in time based on the computed second data value, using the second estimation function, to resultantly reflect the motion undergoing by the object.

28. The method of claim 27, wherein the method further comprises receiving from the remote server, third information identifying a third estimation function, the third estimation function being reflective of a second geometric relationship of the third point to the second point of the object; and computing a fourth data value that proximately depicts a fourth position of third point of the object at the second point in time based on the computed third data value, using the third estimation function, to resultantly reflect the motion undergoing by the object.

29. The method of claim 28, wherein the method further comprises receiving from the remote server, a first estimation correction delta value; and performing one of the computations using the corresponding one of the first, the second and the third estimation function and the first estimation correction delta value to improve its proximate depicting of the corresponding one of the first, the second and the third position of the corresponding one of the first, the second and the third point of the object at the second point in time.

30. The method of claim 28, wherein the method further comprises receiving from the remote server, a first, a second and a third estimation correction delta value; and performing the computations correspondingly using the first, the second and the third estimation function and the first, the second, and the third estimation correction delta value to improve their corresponding proximate depicting of the first, the second and the third position of the first, the second and the third point of the object at the second point in time.

31. The method of claim 27, wherein the method further comprises receiving from the remote server, a first and a second estimation correction delta value; and performing the computations correspondingly using the first and the second estimation function, and the first and the second estimation correction delta value to improve their corresponding proximate depicting of the first and the second position of the first and the second point of the object at the second point time.

32. The method of claim 27, wherein the first and second information comprise a first and a second index correspondingly indexing the first and the second estimation function.

33. The method of claim 27, wherein the motion comprises a selected one of a linear motion, an oscillating motion and a snap back motion.

34. The method of claim 27, wherein the method further comprises receiving from the remote server, a fourth data value for a fourth position of a third point of an object at the first point in time;

receiving from the remote server a third information identifying a third estimation function, the third estimation function being reflective of a second geometric relationship of a fourth point to the third point of the object; and computing a fourth data value that proximately depicts a fifth position of the fourth point of the object at the second point in time based on a fifth data value, using the third estimation function, to resultantly reflect the motion undergoing by the object, the fifth data value being computed using the first estimation function and proximately depicting a sixth position of the third point at the second point in time.

* * * * *